US006786825B2

(12) United States Patent
Kawazu

(10) Patent No.: US 6,786,825 B2
(45) Date of Patent: Sep. 7, 2004

(54) VIDEO GAME IN WHICH PLAYER SETS CONTROL VALUES

(75) Inventor: Akitoshi Kawazu, Tokyo (JP)

(73) Assignee: Kabushiki Kaisha Square Enix, Tokyo (JP)

(*) Notice: Subject to any disclaimer, the term of this patent is extended or adjusted under 35 U.S.C. 154(b) by 176 days.

(21) Appl. No.: 09/977,460

(22) Filed: Oct. 16, 2001

(65) Prior Publication Data

US 2002/0137564 A1 Sep. 26, 2002

(30) Foreign Application Priority Data

Mar. 26, 2001 (JP) ........................................ 2001-087449

(51) Int. Cl.[7] .............................................. A63F 13/00
(52) U.S. Cl. ........................................................ 463/43
(58) Field of Search ...................... 463/1–8, 23, 40–44

(56) References Cited

U.S. PATENT DOCUMENTS

| | | | | |
|---|---|---|---|---|
| 5,601,487 A | * | 2/1997 | Oshima et al. ................. | 463/4 |
| 5,649,862 A | * | 7/1997 | Sakaguchi et al. ............ | 463/44 |
| 5,810,666 A | * | 9/1998 | Mero et al. .................... | 463/41 |
| 6,267,677 B1 | * | 7/2001 | Tajiri et al. .................... | 463/43 |
| 6,273,822 B1 | | 8/2001 | Tanaka | |
| 6,306,033 B1 | * | 10/2001 | Niwa et al. .................... | 463/1 |
| 6,354,940 B1 | * | 3/2002 | Itou et al. ....................... | 463/8 |
| 2001/0008840 A1 | * | 7/2001 | Sugimoto ....................... | 463/2 |
| 2001/0008846 A1 | * | 7/2001 | Yamauchi et al. ............ | 463/31 |

OTHER PUBLICATIONS

"Weekly FAMITSU, vol. Apr. 6, 2001", Enterbrain, Inc., received by Japanese Patent Office Library on Mar. 26, 2001, vol. 16, No. 14, 642 issue, pp. 76–78, together with a partial English language translation of the same.
"Weekly FAMITSU, vol. Oct. 6, 2002", Enterbrain, Inc., Oct. 6, 2002, vol. 15, No. 40, 616 issue, p. 213, together with a partial English language translation of the same.
"Weekly FAMITSU, vol. Mar. 9, 2001", Enterbrain, Inc., Mar. 9, 2002, vol. 16, No. 10, 638 issue, pp. 24–25, together with a partial English language translation of the same.

* cited by examiner

Primary Examiner—Michael O'Neill
(74) Attorney, Agent, or Firm—Greenblum & Bernstein, P.L.C.

(57) ABSTRACT

A video game program that allows a player to be involved in numerically setting a control value for controlling developments of an RPG is provided. The game program sets an initial range "1 to 5", causes a computer to sequentially display numerical values in the set range for every fixed time, determines whether operation input is received from a keypad, if operation input is received form the keypad, compares operation input timing with display timing of each numerical value, detects a numerical value that is displayed at timing coinciding with the operation input timing, and sets the detected numerical value as a value of attacking power or recovery power. Therefore, a value of an attacking power or a recovery power is variably set according to timing of operation input performed by a player, and various game developments are provided for each player.

21 Claims, 12 Drawing Sheets

517 518 519

520

VIDEO GAME IN WHICH PLAYER SETS CONTROL VALUES

CROSS REFERENCE TO RELATED APPLICATION

The present disclosure relates to subject matter contained in Japanese Patent Application No. 2001-087449, filed Mar. 26, 2001, the disclosure of which is expressly incorporated by reference in its entirety.

BACKGROUND OF THE INVENTION

1. Field of the Invention

The present invention relates to video games. More specifically, the present invention relates to a video game program for making a game progress based on a control value to be numerically set, such as attacking power, an amount of damage and recovery power of a character.

2. Description of the Related Art

One genre of video games, is a role playing game (hereinafter referred to as RPG). The RPG is a game for making a story progress by operating a player character on a screen, causing the player character and another character to talk to each other and causing the player character and an enemy character to battle. In such an RPG, when a player causes a player character to battle with an enemy character, predetermined attacking power is set according to a trick used by the player character, and the attacking power is operated as an amount of damage for the enemy character. Then, when the amount of damage of the enemy character reaches a predetermined value, the enemy character is defeated.

However, in a conventional RPG, predetermined attacking power according to a trick used by a player character is set as described above, and a value of the attacking power is fixed for each trick used by the player character. Thus, an operation of a player cannot be reflected on a control value for controlling developments of the RPG such as attacking power of the player character. As a result, various game developments cannot be provided for each player.

SUMMARY OF THE INVENTION

The present invention has been devised in view of these problems, and it is an object of the present invention to provide a video game program for enabling a player to be involved in numerical setting of a control value for controlling developments of an RPG, a recording medium having the video program recorded therein, a method of setting a control value in a video game and a game apparatus.

In order to solve the above-mentioned problems, according to a first embodiment of the present invention, a game program for making a video game progress on a screen based on a control value to be numerically set in a game progress process is provided, wherein the video game program causes a computer to execute a displaying procedure for sequentially displaying different numerical values repeatedly on the screen; a comparing procedure for comparing display timing of each numerical value to be displayed on the screen in the displaying procedure with operation input timing by a player; and a setting procedure for setting a numerical value displayed at displaying timing coinciding with the operation input timing as the control value based on a result of comparison in the comparing procedures.

Therefore, the computer executes processing in accordance with this game program, whereby different numerical values are sequentially displayed on a screen repeatedly. Then, when a player performs an operation input, display timing of each numerical value and operation input timing by the player are compared, and a numerical value displayed at display timing coinciding with the operation input timing is set as a control value. Thus, since a numerical value to be set as a control value varies according to timing of an operation input performed by a player, the player can be involved in numerical setting of a control value. Therefore, the player makes a video game progress based on a control value that the player is involved, whereby various game developments can be provided for each player.

In another aspect of the present invention, the video game program causes the computer to sequentially display numerical values in a predetermined range on the screen repeatedly in the displaying procedure. Therefore, numerical values in a predetermined range, for example, "1 to 5" and "5 to 10" are sequentially displayed on the screen repeatedly, and a numerical value displayed at display timing coinciding with operation input timing is set as a control value.

In addition, according to another aspect of the present invention, the video game program causes the computer to further execute a determining procedure for determining whether or not the operation input timing is specific timing and, if it is determined that the operation input timing is the specific timing by the determining procedure, enlarges the predetermined ranged such that a maximum value of the numerical value is increased in the displaying procedure, and causes the computer to sequentially display numerical values in the range repeatedly.

That is, in the case in which, initially, numerical values in the range of "1 to 5" is sequentially displayed repeatedly, when a player performs operation input at specific timing, the range is enlarged such that a maximum value of the displayed numerical values "5" is increased, and "1 to 10" or "5 to 10" are sequentially displayed repeatedly with the maximum value as "10". Therefore, a maximum value of a control value that the player can set by operation input is "5" in the state in which numerical values in the range of "1 to 5" are displayed, whereas, if the player was able to perform operation input at specific timing, the maximum value of the control value that the player can set by operation input is increased to "10". Thus, a range of control values to be set varies depending on whether or not a player was able to perform operation input at specific timing, the maximum value of the control value that the player can set by operation input is increased to "10". Thus, a range of control values to be set varies depending on whether or not a player was able to perform, whereby more various game developments can be provided for each player.

In addition, according to another aspect of the present invention, the video game virtually realizes a battle between a player character and an enemy character and the control value is an attacking power of the player character. Since a numerical value to be set as the attacking power varies according to timing of operation input performed by the player, the player can be involved in a numerical setting of the attacking power of the player character.

In addition, according to another aspect of the present invention, the video game virtually realizes a battle between a player character and an enemy character and the control value is an amount of damage of the enemy character. Since a numerical value to be set as the amount of damage of the enemy character varies according to timing of operation input performed by the player, the player can be involved in numerical setting of the amount of damage of the enemy character.

In addition, according to another aspect of the present invention, the video game virtually realizes a battle between a player character and an enemy character and the control value is recovery power of the player character. Since a numerical value to be set as the recovery power varies according to operation input timing by the player, the player can be involved in numerical setting of the recovery power.

In addition, according to another aspect of the present invention, the video game virtually realizes a battle between the player character and an enemy character via a card to be displayed on the screen. Therefore, since the attacking power, the recovery power and the like that should be set in a card varies according to timing of operation input performed by the player in the case of this video game, the player can be involved in setting of a numerical value to be set in a card.

In addition, according to a second embodiment of the present invention, a video game program recorded in a recording medium causes a computer to read the program, whereby effects similar to those described in the first embodiment of the present invention can be obtained. In addition, according to a third embodiment of the present invention, a method of setting a control value causes a computer to execute processing in operations to be described, whereby effects similar to those described in the first embodiment of the present invention can be obtained. Therefore, the processing operation to be described is executed using hardware such as a general-purpose computer and a general-purpose game apparatus, whereby a control value setting technology in the video game of the present invention can be easily implemented with the hardware.

In addition, according to a fourth embodiment of the present invention, effects similar to those described in the first embodiment of the present invention can be obtained as a game apparatus.

Other objects and advantages besides those discussed above shall be apparent to those skilled in the art from the description of a preferred embodiment of he invention which follows. In the description, reference is made to accompanying drawings, which from a part hereof, and which illustrate an example of the invention. Such an example, however, is not exhaustive of the various embodiments of the invention, and therefore reference is made to the claims which follow the description for determining the scope of the invention.

DETAILED DESCRIPTION OF THE PREFERRED EMBODIMENTS

Embodiments of the present invention will be hereinafter described with reference to the accompanying drawings. Further, in the following descriptions, the case in which the present invention is applied to a game machine for home use is explained as an example.

Figure 1:
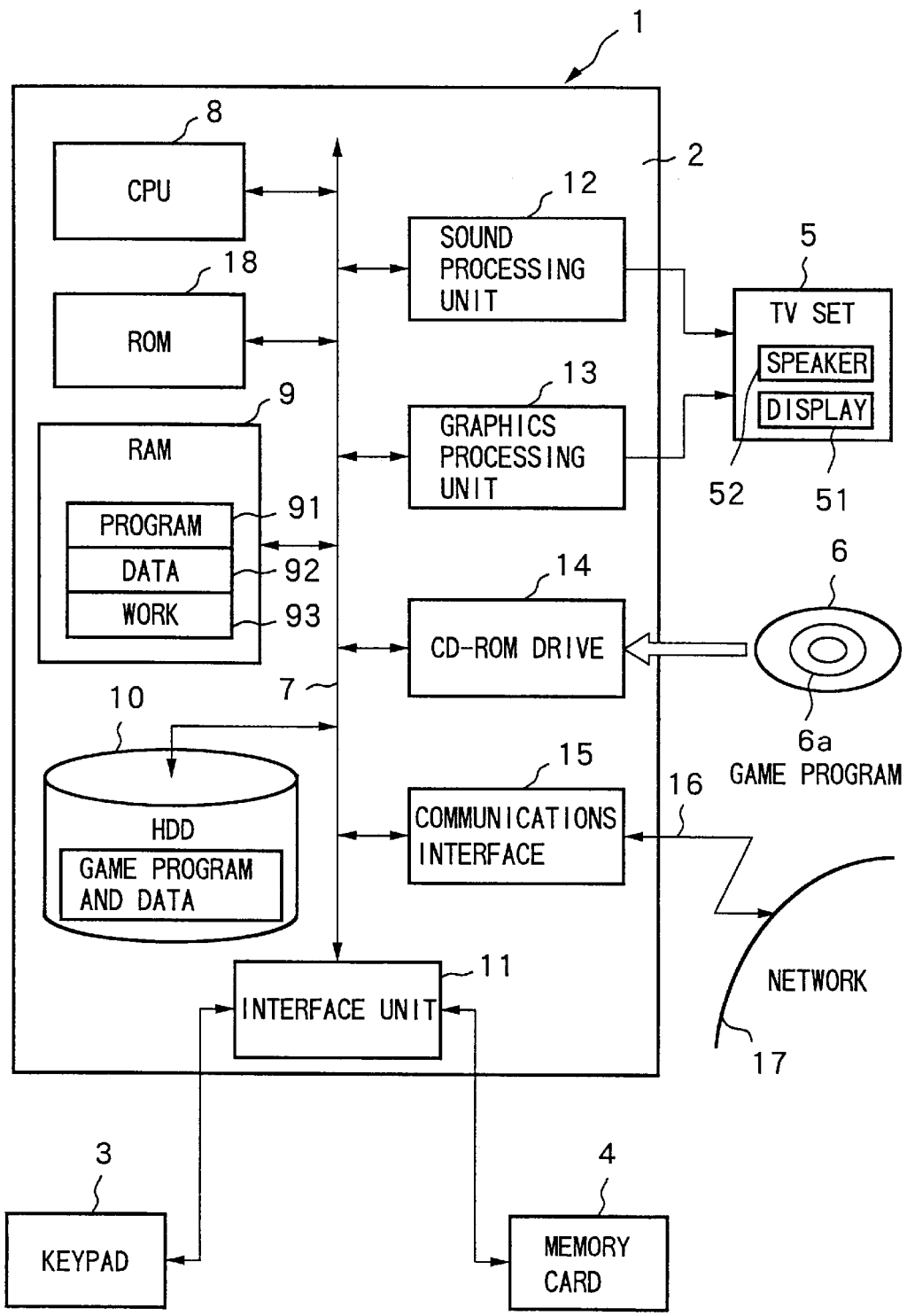
FIG. 1 is a block diagram showing an overall configuration of a game apparatus to which an embodiment of the present invention is applied.

FIG. 1 is a block diagram showing a configuration of a game apparatus in accordance with an embodiment of the present invention. As shown in the figure, this game apparatus 1 includes, for example, a game machine main body 2, a keypad 3, a memory card 4, a TV set 5 and a CD-ROM 6.

The game machine main body 2 is composed of, for example, a CPU 8 (Central Processing Unit), an ROM (Read Only Memory) 18, an RAM (Random Access Memory) 9, an HDD (Hard Disk) 10, an interface unit 1 1, a sound processing unit 12, a graphics processing unit 13, a CD-ROM (Compact Disc Read Only Memory) drive 14, a detachable CD-ROM 6 and a communications interface 15, which are connected to each other via a bus 7.

The CPU 8 sequentially executes a program stored in the RAM 9 to perform processing for progressing a game based on a basic program such as a boot program and an OS (Operating System) stored in the ROM 18. In addition, the CPU 8 controls operations of each of the components in the game machine main body 2.

The RAM 9 is used as a main memory of the game machine main body 2 and stores a program and data required for progress of a game, which are transferred from the CD-ROM 6. In addition, the RAM 9 is also used as a work area in executing a program. That is, a program storage area 91, a data storage area 92, a work area 93 and the like are allocated to the RAM 9. A program and data to be stored in the program storage area 91 and the data storage area 92 are read from the CD-ROM 6 by a CD-ROM drive 14 in accordance with control of the CPU 8 and transferred to the RAM 9. Various kinds of data required during progress of a game are temporarily stored in the work area 93.

A game program and data received from an external network 17 via the communications interface 15 and a communications line 16 are stored in the HDD 10. The detachable keypad 3 and the memory card 4 are connected to the interface unit 11. The interface unit 11 controls exchanges of data between the keypad 3 and the memory card 4 that are outside of the game machine main body 2 and the CPU 8 and the RAM 9. Further, the keypad 3 is provided with direction keys and various buttons. A player operates these keys and buttons to execute inputs required for progress of a game such as an instruction to move and an instruction to operate to the player's own character. In addition, the memory card 4 saves data indicating a state of progress of a game.

The sound processing unit 12 performs processing for reproducing sound data such as BGM (Background Music) and sound effects corresponding to a state of progress of a game in accordance with an instruction from the CPU 8 and outputs the sound data to the TV set 5 as a voice signal.

The graphics processing unit 13 performs three-dimensional graphics processing in accordance with an instruction from the CPU 8 and generates image data corresponding to a state of progress of a game. The graphics processing unit 13 adds a predetermined synchronization signal to the generated image data to output the data to the TV set 5 as a video signal.

The CD-ROM drive 14 drives the CD-ROM 6 set in the game machine main body 2 in accordance with an instruction from the CPU 8 and transfers a program and data stored in the CD-ROM 6 to the RAM 9 via the bus 7.

The communications interface 15 is connected to the external network 17 via the communications line 16 and performs processing for exchanging a program and data with the external network 17 in accordance with an instruction from the CPU 8.

The CD-ROM 6 stores a program and data (game program 6*a*) required for progress of a game. The CD-ROM 6 is driven by the CD-ROM drive 14, whereby the stored program and data are read. The program and data read from the CD-ROM 6 are transferred to the RAM 9 from the CD-ROM drive 14 via the bus 7.

The TV set 5 is provided with a display screen 51 consisting of a CRT (Cathode Ray Tube) or the like for displaying an image corresponding to a video signal from the graphics processing unit 13 and a speaker 52 for outputting voices corresponding to a voice signal from the sound processing unit 12. Usually, a television receiver is used as the TV set 5.

Figure 2:
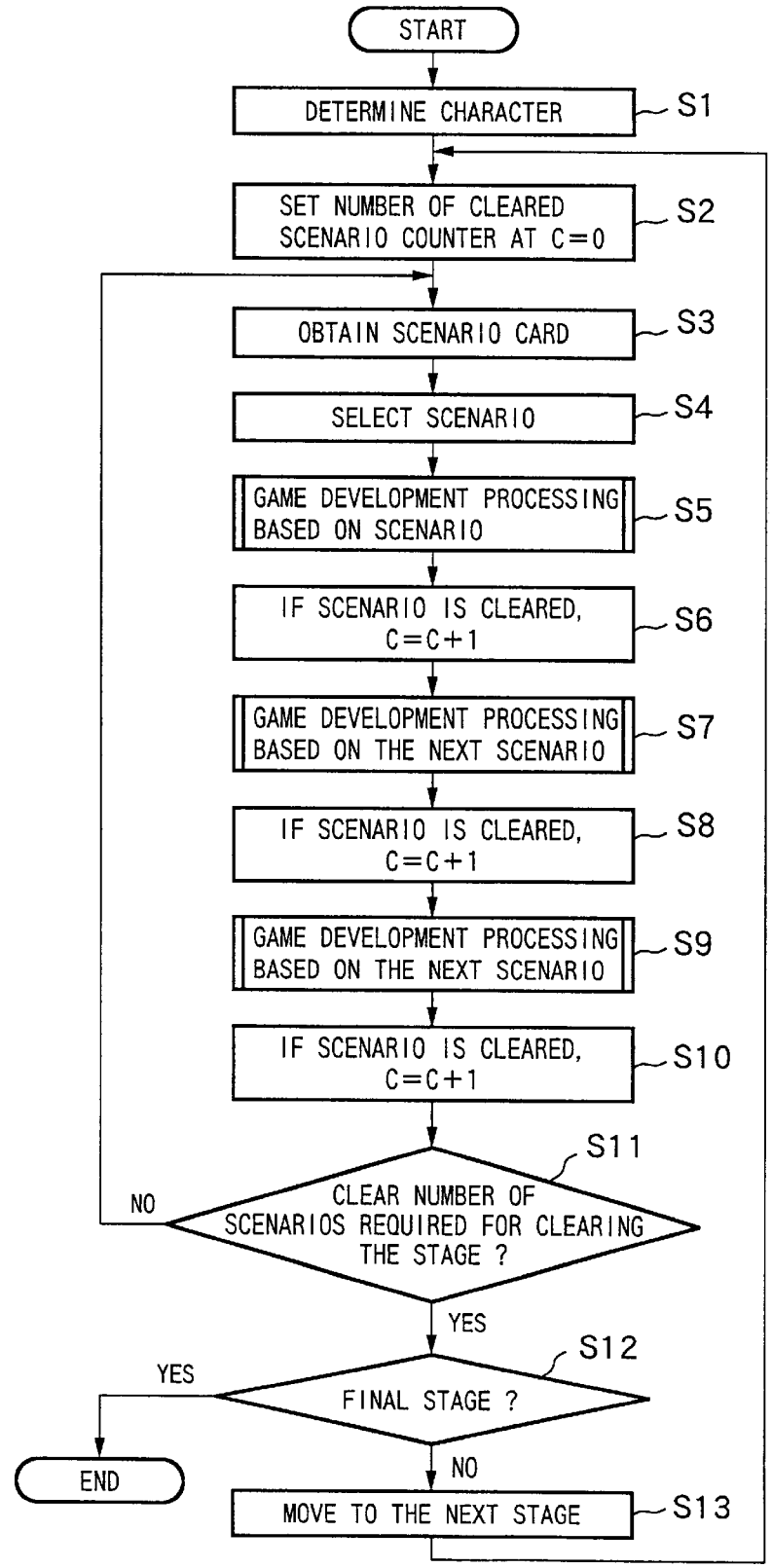
FIG. 2 is a main flow chart showing exemplary processing procedures of a CPU.

In this embodiment in accordance with the above-mentioned configuration, when a game is started, the CPU 8 secures an area for storing information in the RAM 9, whereby the program storage area 91, the data storage area 92, the work area 93 and the like are secured in the RAM 9. Then, upon receiving a game starting request, the CPU 8 reads information required for a game to be started from the CD-ROM 6 into the RAM 9, whereby a game program is stored in the program storage area 91 and various kinds of data are stored in the data storage area 92. The CPU 8 executes processing indicated in a flow chart of FIG. 2 in the first place based on the game program stored in the program storage area 91.

Figure 3:
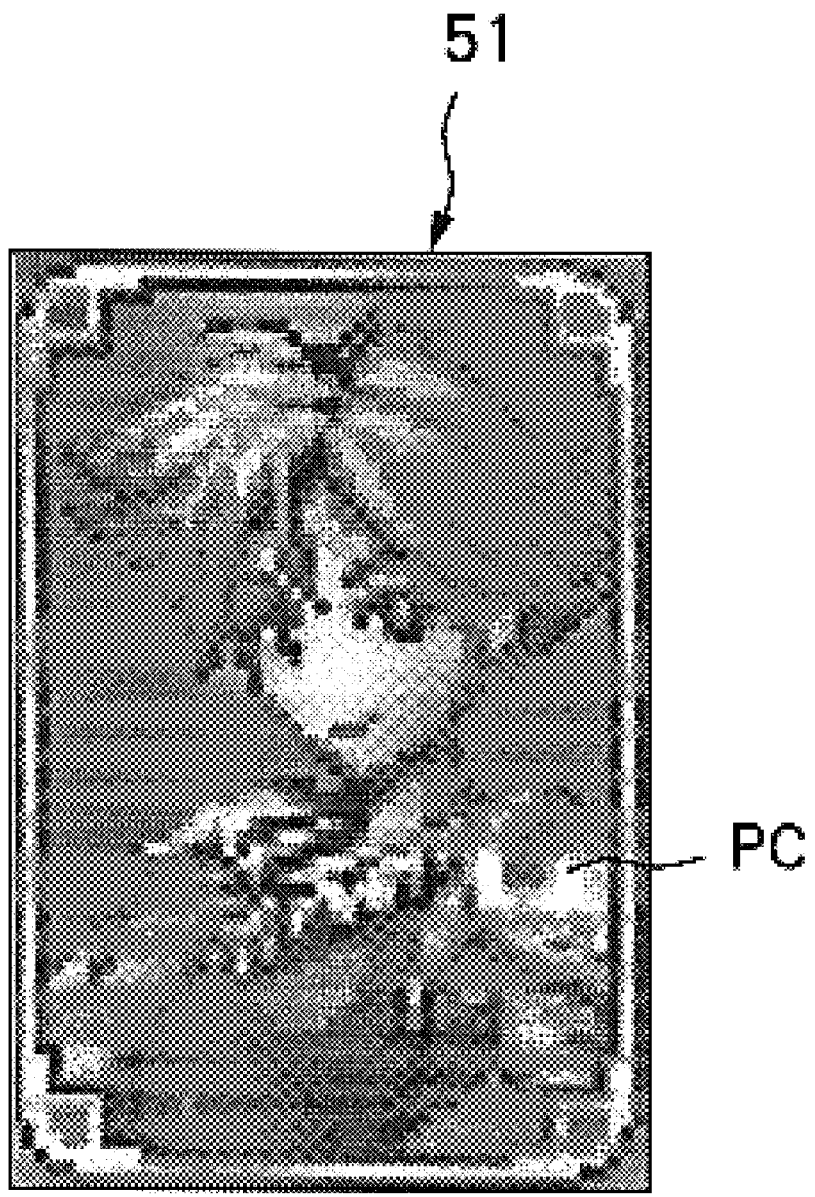
FIG. 3 illustrates an example of a player character in the form of a card.

That is, the CPU 8 executes character determination processing first (step S1). This character determination processing is processing for determining a character of the player among a group of characters and causes the display 51 to display a group of (e.g., seven) questions consisting of a group of choices, respectively. When selection of any choice is completed in response to all the questions, a specific character is determined as a character of the player (player character PC), and the player character PC is displayed on the display 51 as a card as shown in FIG. 3. That is, in this embodiment, unlike an ordinary RPG, the player character PC appears in the form of a card instead of appearing as a personified character.

Further, this processing of step S1 is only executed when an RPG in accordance with this embodiment is played for the first time. When the game is subsequently started, processing is started regarding the selected character as a player character PC (card) based on saved data stored in the memory card 4. In addition, on the display 51, display is divided into upper and lower parts. In the lower part of the screen, a player character PC in the form of a card is mainly displayed, and an enemy character and other characters in the form of a card, which appear in the following descriptions, are mainly displayed in the upper part of the screen.

Subsequently, after setting "0" in a counter C for counting the number of cleared scenarios (step S2), scenario obtaining processing is executed (step S3). A player character PC meets a character operated by a computer in a predetermined place (e.g., a town) and obtains information concerning a certain scenario by the character, whereby a scenario card for the scenario can be obtained. Therefore, the number of available scenario cards is different depending on the number of characters that the player character PC meets. In addition, in this scene, the player may propose that a character the player character PC meets be a comrade of the player character PC. In this way, it becomes possible to increase the number of allies. Here, scenario cards are associated with scenarios forming a different development and a story, respectively.

Figure 4:
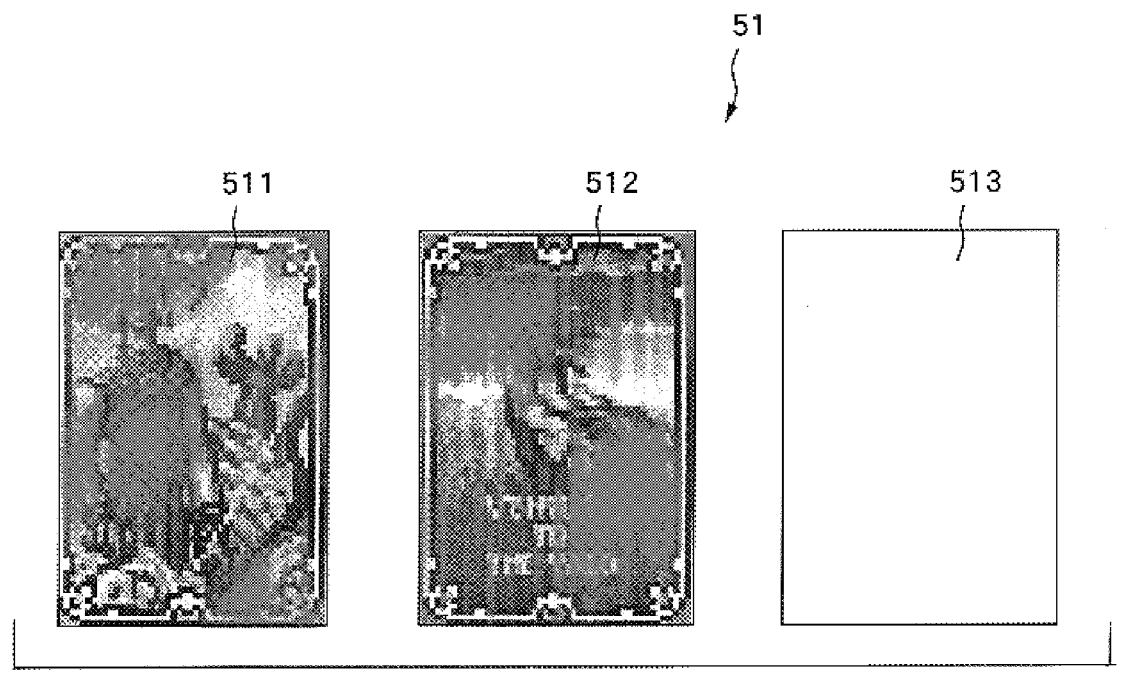
FIG. 4 illustrates examples of scenario cards.

Next, scenario selection processing is executed (step S4). In this scenario selection processing, the scenario card obtained in step S3 is used. As shown in an example of FIG. 4, scenario cards 511, 512 and 513 obtained by the player character PC are displayed on the display 51. Any one of the three scenario cards 511, 512 and 513 is selected according to operation of the keypad 3 by the player.

When any one of the scenario cards is selected, game development processing based on the scenario to be described later is executed (step S5), and when the scenario is accomplished by this game development processing, a value of the counter C is incremented (step S6). Further, whether the scenario is cleared or not is determined by whether a mission is accomplished or not as described later. A mission provided for each scenario in this context is such as defeating a boss monster of an opponent or finding a predetermined item.

When game processing based on the scenario ends in accordance with operation with the keypad 3 by the player and progress of a game, in the two remaining scenario cards among the above-mentioned three scenario cards 511, 512 and 513, game development processing based on a scenario corresponding to any one of the cards is started (step S7). Then, if the scenario is cleared by this game development processing, a value of the counter C is incremented (step S8).

In addition, when a game based on the scenario ends, game development processing based on a scenario of the remaining one scenario card among the above-mentioned three scenario cards 511, 512 and 513 is executed (step S9). If the scenario is cleared in this game development processing, a value of the counter C is incremented (step S10).

Subsequently, it is determined whether or not the number of scenarios required for clearing the stage is cleared based on the value of the counter C (step S11). If the number of scenarios required for clearing the stage is not cleared, the processing of step S3 and subsequent steps is repeated. Further, scenario cards of the number required for clearing a stage or more (e.g., five) are obtained before starting the stage and an arbitrary three scenario cards among them are cleared, whereby the stage may be cleared.

Then, if the number of scenarios required for clearing the stage is cleared (step S11; YES), it is determined whether or not the stage cleared this time is a final stage among all the stages set in this RPG (step S12). If it is not the final stage and stages that should be cleared still remain, the processing moves to the next stage (step S13) and processing of step S2 and subsequent steps is repeated. In addition, here, the processing may return to step S1 instead of step S2. In this way, it becomes possible for a player to play using a different player character for each stage.

That is, the same processing as in the above-mentioned step S2 to step S12 is performed in each stage, and games are developed by stories based on three types of scenarios corresponding to three scenario cards. Then, when all the games based on the three types of scenarios corresponding to the three scenario cards are cleared, the processing moves to the next stage. Finally, when all the stages set in this RPG are cleared, the determination in step S12 is YES, and the game is completely performed.

Figure 5:
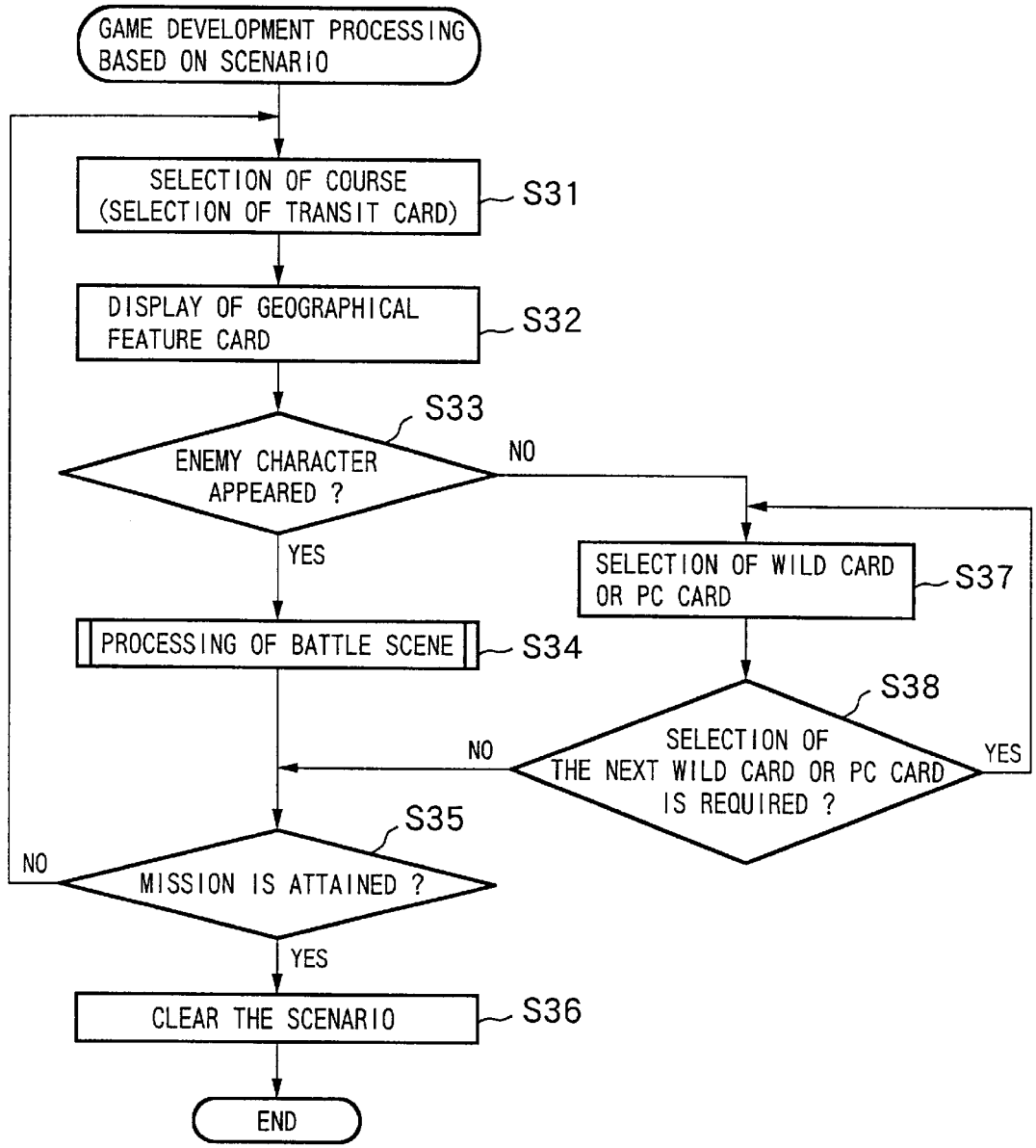
FIG. 5 is a flow chart showing details of exemplary processing for game developments based on a scenario.

FIG. 5 is a flow chart showing details of game development processing based on scenarios to be executed in the above-mentioned steps S5, S7 and S9. First, course selection processing (selection processing of a transit card) is executed (step S3 1). In this course selection processing (selection processing of a transit card), a group of transit cards are displayed on the display 51. On the surface of each of the transit cards, a figure indicating "climb a ladder", "go up the stairs", "open a door" or the like is displayed. The player selects a transit card corresponding to an action that the player wishes a character to take among the displayed transit cards by operation of the keypad 3. Thus, game processing is executed according to the selected transit card and the RPG progresses.

Subsequently, a geographic feature card relating to the selected transit card is displayed on the display 51 (step S32).

Figure 6:
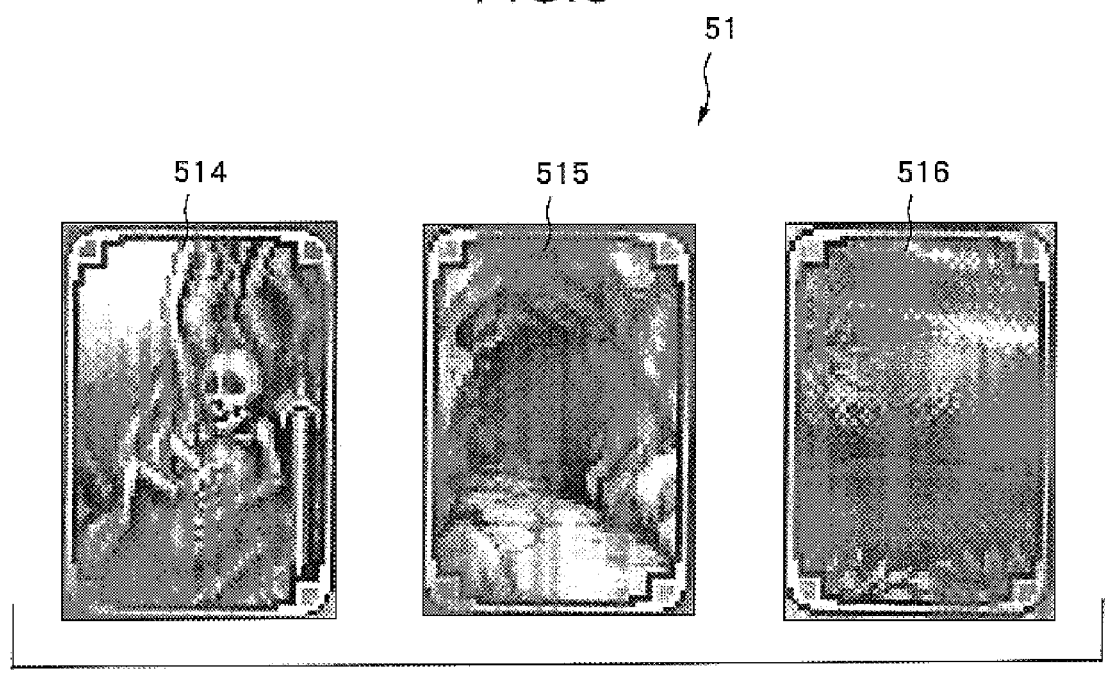
FIG. 6 illustrates examples of geographical feature (obstacle geographical feature) cards.

Examples of the geographic feature card are shown in 514, 515 and 516 of FIG. 6. Figures indicating "passage where a skeleton is lying", "cave", "lake" or the like are displayed on a displaying surface of these geographic feature cards.

The player instructs the player character PC to take any action with respect to a geographic feature card displayed on the screen. In addition, in the case of a certain geographic feature card, an enemy character appears simultaneously with it. In this case, a battle is started. Battle processing will be described in detail later.

In a scene in which the player character PC does not encounter an enemy (scene other than a battle), the player executes selection processing for selecting PC (player character) cards or wild cards with respect to the displayed geographic feature card (step S37). These cards are PC (player character) cards and wild cards that the player character PC owns virtually, with which a player character PC determines an operation on a game.

Here, as specific examples of the wild card, there are cards indicating "advance", "look out over", "try at any rate" and the like. On the other hand, as specific examples of the PC (player character) card, there are cards indicating "run away", "check well", "medical herb", "jump", "release a trap", "open a lock", "thrust", "cut", "release an arrow", "magic of fire", "magic of water" and the like.

Either of a group of cards consisting of a group of PC cards or a group of cards consisting of a group of wild cards is displayed on a lower part of the screen according to an operation of the player. Then, the player operates the keypad 3 to select one of the cards, whereby an action of the player character PC is determined.

For example, in a geographic feature card indicating a certain place (a cave, a hole opened in a large tree, or the like), a "look out over" card being a wild card is used. Then, a geographic card indicating a treasure box is displayed. Here, a "check well" card being a PC (player character) card is used. Then, it is displayed on the screen that releasing of a trap and opening a lock are required to open this treasure box. Thus, "release a trap" and "open a lock" cards being PC (player character) cards are used, whereby the treasure box is opened and items inside the treasure box are displayed on the screen. Subsequently, a "try at any rate" card being a wild card is used, whereby the items in the box can be obtained.

Figure 8:
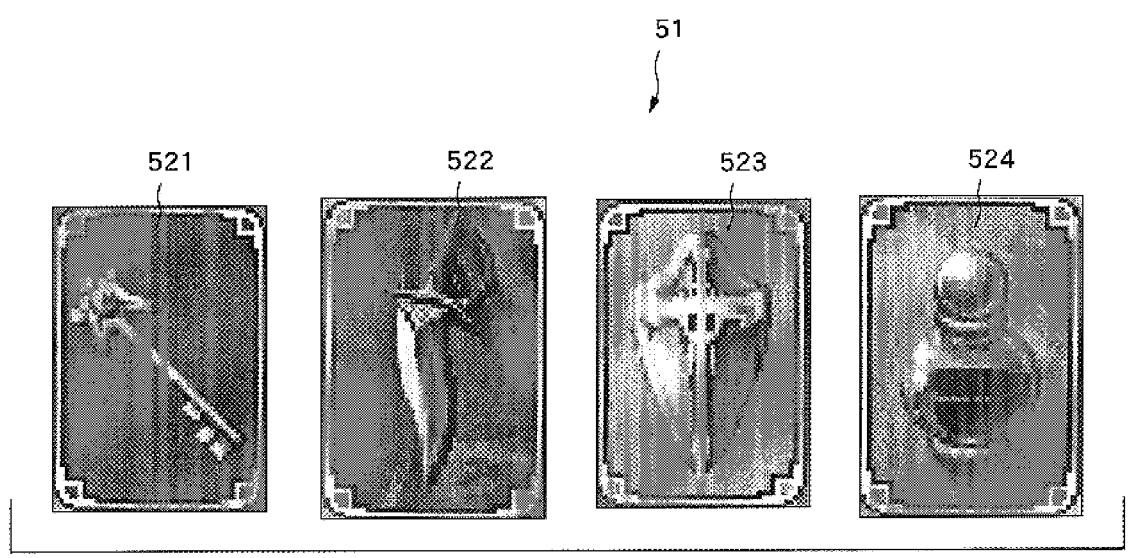
FIG. 8 illustrates examples of item cards.

Here, as available items, there are money and a key 521, a knife 522, a protector 523, a pot 524 and the like shown in FIG. 8. Any player character PC is selected by an operation of the keypad 3 to have the player character PC to hold the obtained items. Thus, the obtained item can be used.

In addition, if it is not particularly necessary to take a specific action such as "check well" with respect to the displayed geographical feature, a "advance" card being a wild card is used. Thus, the processing advances to the next geographical feature card (transit card).

That is, when selection of a transit card is executed in step S31, a geographical card relating to the selected transit card is displayed on the display 51 (step S32). Subsequently, it is determined whether or not an enemy character has appeared simultaneously with the appearance of this geographical feature card (step S33) and, if an enemy character has appeared, processing of a battle screen to be described later is executed (step S34). Thereafter, in this processing of battle screen, it is determined whether or not the player character PC has attained a mission set on the scenario (step S35) and, if the mission has not been attained, the processing of step S31 and subsequent steps is repeated. Then, if the player character PC has attained the mission set on the scenario, it is determined that the scenario is cleared (step S36).

Figure 7A:
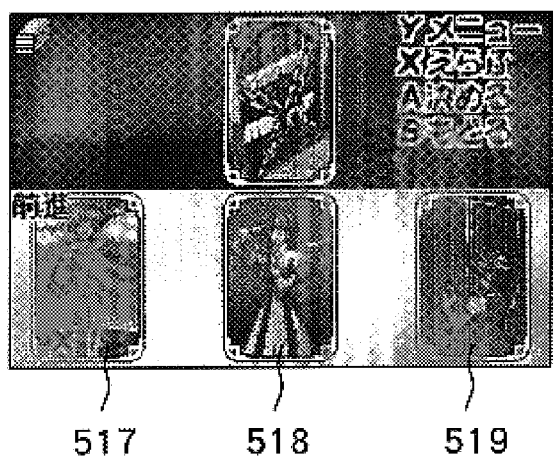
FIGS. 7A and 7B illustrate examples of a PC card and a wild card.
Figure 7B:
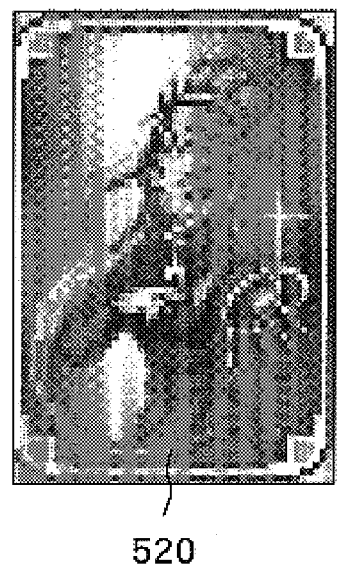

In addition, if it is determined that an enemy character has not appeared as a result of the determination in step S33, processing for selecting a wild card or a PC card is executed (step S37). In the processing for selecting a wild card or a PC card, as shown in FIGS. 7A and 7B, the computer causes the display 51 to display PC cards 520 or wild cards 517 to 519. Here, the example wild cards 517, 518 and 519 indicate "advance", "look out over" and "try at any rate", respectively, and the PC card 520 is a card indicating "open a lock". That is, in an ordinary RPG, a player character PC takes an action on a screen according to an operation on the keypad 3, whereas, in the RPG in accordance with this embodiment, a player character PC is not made to take an action on the screen. Instead, the PC cards and wild cards 517 to 520 are selected, whereby it is assumed that the player character PC has taken an action corresponding to the selected card. Thus, the game processing is executed according to the selected PC cards or the wild cards 517 to 520 and the RPG progresses. Then, in step S38, it is determined whether or not selection of the next wild cards or PC cards is necessary. If it is necessary, the processing of step S37 and subsequent steps is repeated. If it is unnecessary, the processing advances to the above-mentioned step S35.

Figure 9:
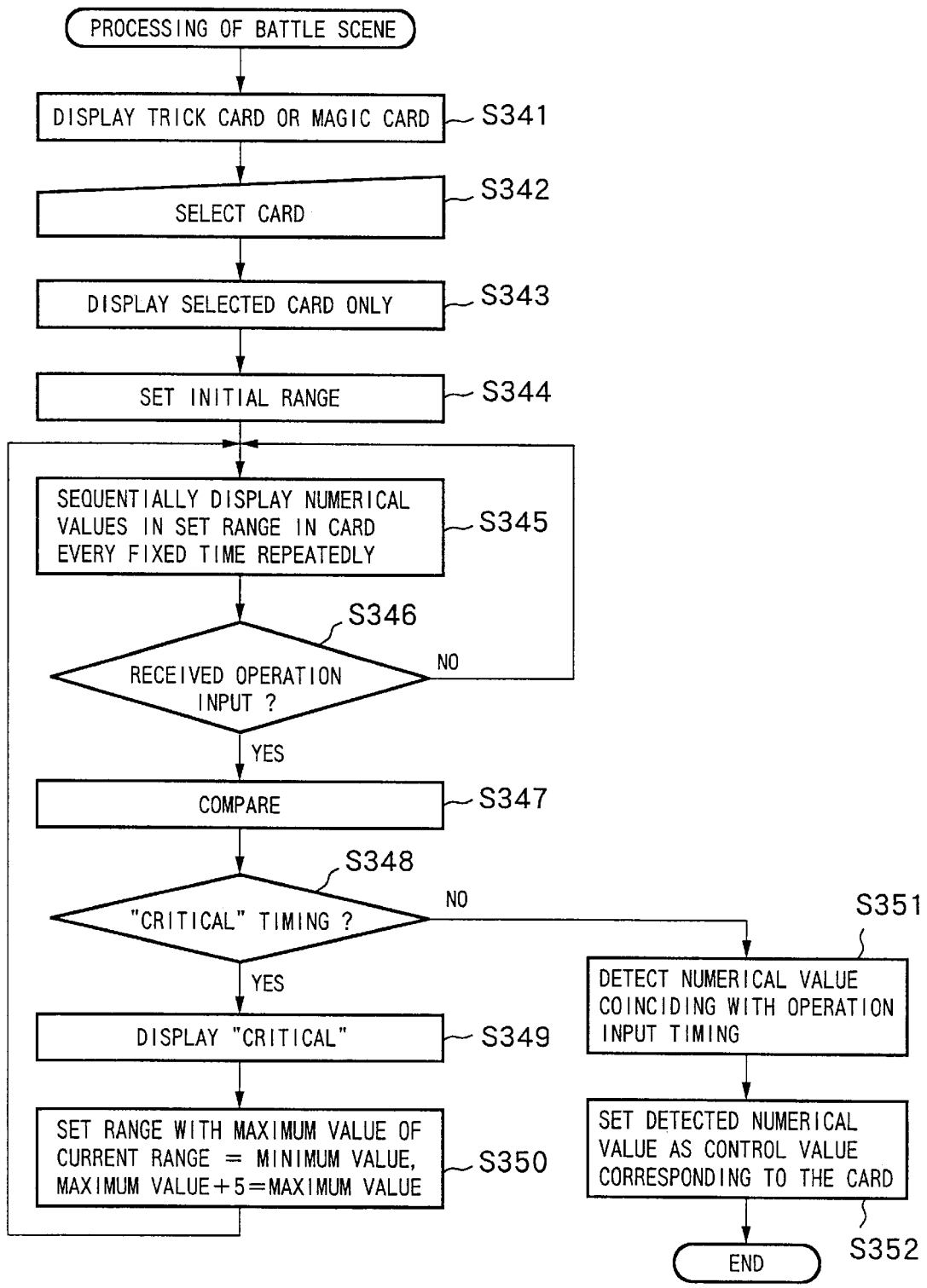
FIG. 9 is a flow chart showing details of exemplary processing of a battle screen.
Figure 10:
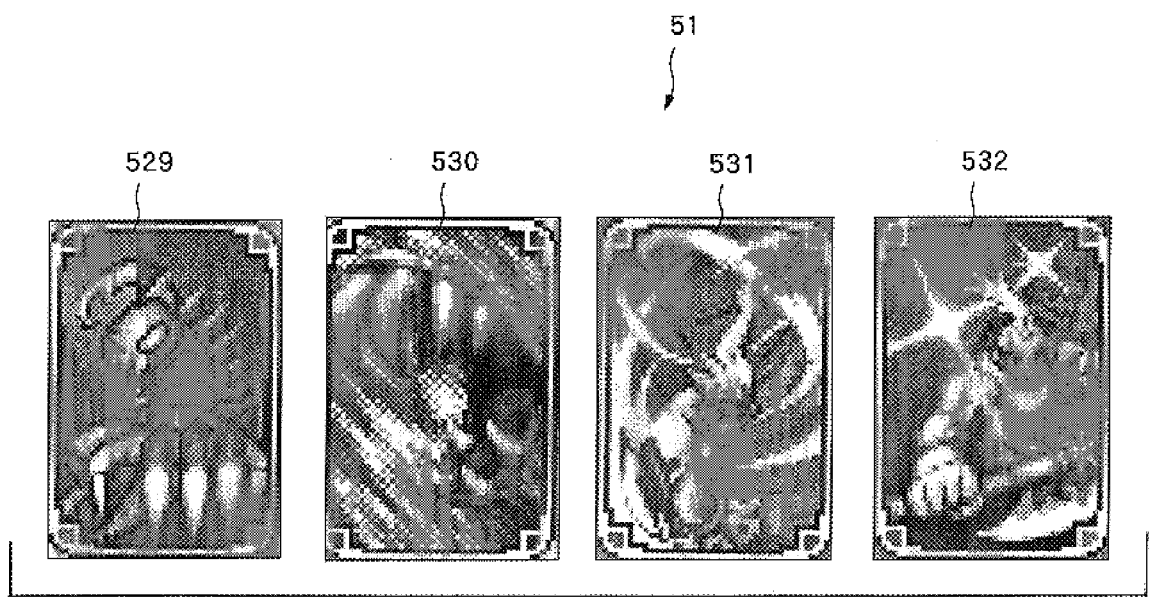
FIG. 10 illustrates examples of trick cards.
Figure 11:
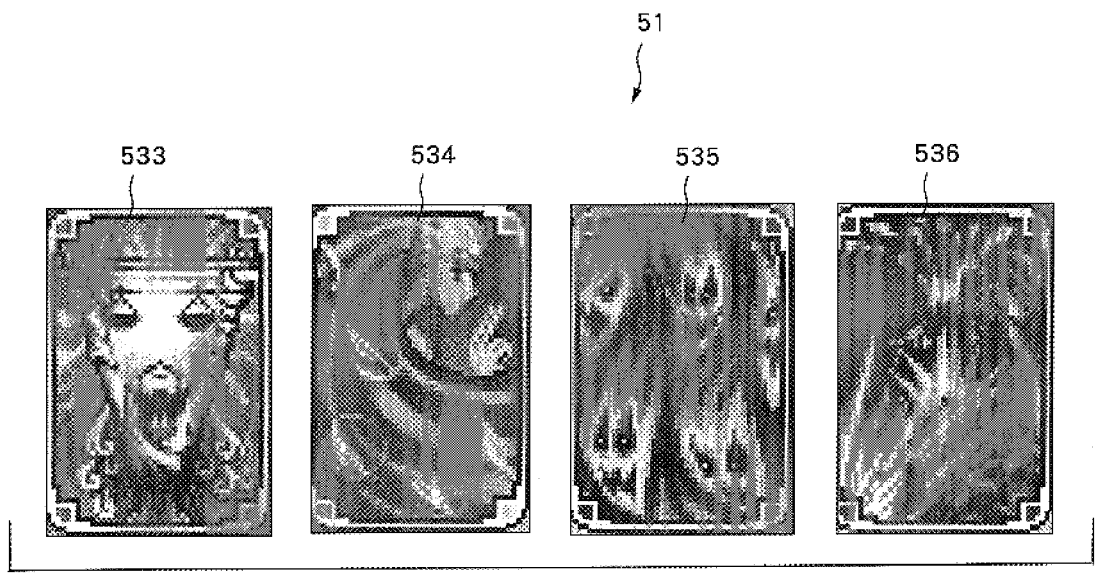
FIG. 11 illustrates examples of magic cards.

FIG. 9 is a flow chart showing details of the above-mentioned processing of a battle scene (step S34). In this processing of a battle scene, the computer causes the display 51 to display trick cards 529 to 532 shown in FIG. 10 or magic cards 533 to 536 shown in FIG. 11. Then, for example, with the trick cards 529 to 532 displayed (step S341), any of them is selected by operation of the keypad 3 (step S342), and only the selected card is displayed (step S343).

Figures 12A, 12B, 12C:
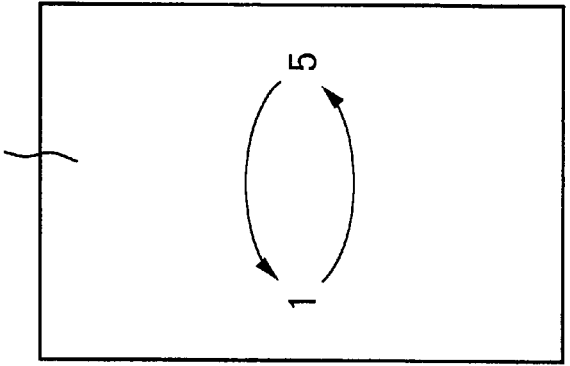
FIGS. 12A, 12B, and 12C illustrate a screen display transition in processing of a battle screen.

Next, an initial range is set (step S344). This initial range is "1 to 5" in this embodiment. Moreover, numerical values in a range set in the selected card are sequentially displayed for every fixed time (e.g., 1/10 second) (step S345). Therefore, if the trick card 536 is selected in step S342 by the processing of step S345, the numerical values "1 to 5"

are sequentially displayed repeatedly at an interval of 1/10 second on the trick card 536 displayed on the display 51, as schematically shown in FIG. 12A.

Subsequently, it is determined whether or not an operation input is received from the keypad 3 (step S346), and the processing of step S345 is repeated until an operation input is received. If an operation input is received from the keypad 3, operation input timing and display timing of each numerical value by step S345 and "critical" timing are compared (step S347). This "critical" timing is specific timing in this embodiment, which is for example timing of every 1/25 second.

The "operation input timing" is the player's optional timing of when the keypad 3 is pressed. If the player decides to do an action (e.g., attacking) and presses the keypad 3, that will be the timing of the "operation input timing." The "critical timing" is the timing set by the program or like a periodical pulse given by the program (e.g., every 1/25 seconds). The comparing process (step 347) is performed by checking if the "operation input timing" coincides with the program given a periodical pulse or the "critical timing." The player must hit the keypad 3 with the exact same timing as the programmed pulse in order to get the "critical."

Then, it is determined whether or not the operation input timing coincides with the "critical" timing as a result of the comparison in step S347 (step S348). If both timing values do not coincide, a numerical value displayed in timing coinciding with the operation input timing is detected (step S351). Moreover, the detected numerical value is set as a control value corresponding to the card (step S352).

Therefore, if the trick card 356 is a card for increasing attacking power of the player character PC, the attacking power of the player character PC is variably set in the range of 1 to 5 according to timing of operation input performed by the player. In addition, if it is assumed that the magic card 529 is selected and the magic card 529 is a card for increasing recovery power of the player character PC, recovery power of the player character PC is variably set in the range of 1 to 5 according to timing of operation input performed by the player.

On the other hand, if it is found that the operation input timing coincides with the "critical" timing as a result of the determination in step S348, "critical" is displayed (step S349) on the trick card 356 displayed on the display 51.

Next, a range having a maximum value of a current range as a minimum value and a maximum value of the current range plus five as a maximum value is set (step S350). That is, if the current range is the initial range "1 to 5", its maximum value is "5". Thus, "5" is a minimum value of a range to be set next, and "5+5", i.e., "10" is a maximum value of the range to be set next. Therefore, the range "5 to 10" is set by the processing of step S350, and the processing of step S345 and the subsequent steps is repeated. In this way, as schematically shown in FIG. 12A, the numerical values "5 to 10" are sequentially displayed repeatedly at the interval of 1/10 second on the trick card 536 displayed on the display 51.

Moreover, if it is found that the operation input timing coincides with the "critical" timing as a result of the determination in step S348, the loop of steps S345 to S350 repeats each time the coincidence occurs. Therefore, if the operation input timing coincides with the "critical" timing continuously, the minimum value and the maximum value of the range becomes much larger value. Then, if it is found that the operation input timing does not coincide with the "critical" timing as a result of the comparison in step S347, the processing of steps S351 and S352 is executed as described above. Thus, numerical values of larger values are detected in step S351, which are set as a control value according to the card in step S352.

That is, if the trick card 356 is a card for increasing attacking power of the player character PC, the attacking power of the player character PC is variably set in the range of much larger values. In addition, if it is assumed that the magic card 529 is selected and this magic card 529 is a card for increasing recovery power of the player character PC, the recovery power of the player character PC is variably set in the range of much larger values.

Then, if the player character PC finally accomplishes a mission before a life point, set in the player character PC (card) in advance, becomes "0", step S36 in the flow chart shown in FIG. 5 becomes YES, and clearing of the scenario is certified (step S37). This life point is a value in which the larger a value of attacking power or recovery power the smaller a reduction frequency. Therefore, if a value of attacking power or recovery power is variably set according to timing of operation input performed by a player, an accomplishment ratio of a mission changes naturally, and various game developments are provided for each player.

Further, timing of display and a speed of display of numerical values or a range of numerical values to be displayed shown in the above-mentioned embodiment are only examples, and appropriate timing of display and speed of display of numerical values or an appropriate range of numerical values to be displayed can be used.

Further, although the case in which the present invention is realized with a game machine for home use as a platform is described in this embodiment, the present invention may be realized with a general-purpose computer such as a personal computer or an arcade game machine as a platform.

Moreover, a program and data for realizing the present invention are stored in a CD-ROM, which is used as a recording medium in this embodiment. However, a recording medium is not limited to a CD-ROM and may be a DVD (Digital Versatile Disc), other computer readable magnetic and optical recording media or a semiconductor memory. Furthermore, a program and data for realizing the present invention may be provided in the form of being preinstalled in a storage device of a game machine or a computer in advance.

In addition, a program and data for realizing the present invention may be downloaded from another apparatus on the network 17 connected by the communications interface 15 shown in FIG. 1 via the communications line 16 to the HDD 10 and used. In addition, the program and the data may be recorded in a memory on another apparatus side on the communications line 16 and sequentially stored in the RAM 9, if necessary, via the communications line 16 and used.

In addition, a form of providing a program and data for realizing the present invention may be such that the program and the data are provided as a computer data signal superimposed on a carrier wave from another apparatus on the network 17. In this case, the other apparatus on the network 17 is requested from the communications interface 15 via the communications line 16 to transmit the computer data, and the transmitted computer data signal is received and stored in the RAM 9. It is also possible to realize the present invention in the game apparatus 1 using the program and the data stored in the RAM 9 in this way.

As described above, according to the present invention, when a video game is progressed on a screen based on a control value to be numerically set in a game progress process, a numerical value to be set as the control value may vary according to timing of operation input performed by a player. Thus, the player can be involved in numerically setting a control value and it becomes possible to form various game developments for each player.

The present invention is not limited to the above embodiments and various changes and modifications can be made within the spirit and scope of the present invention. Therefore, to apprise the public of the scope of the present invention the following claims are made.

What is claimed is:

1. A recording medium having recorded therein a computer readable video game program for making a video game to progress on a screen based on a control value to be numerically set in a game progress process, wherein the video game program causes a computer to execute:

a displaying procedure that sequentially displays different numerical values repeatedly on said screen;

a comparing procedure that compares display timing of each numerical value to be displayed on said screen in said displaying procedure with operation input timing by a player; and a setting procedure that sets a numerical value displayed at displaying timing coinciding with said operation input timing as the control value based on a result of the comparison in said comparing procedure.

2. The recording medium according to claim 1, wherein the recording medium has stored therein a video game program that causes said computer to sequentially display numerical values in a predetermined range repeatedly on said screen in said displaying procedure.

3. The recording medium according to claim 1, wherein the recording medium has stored therein a video game program that causes said computer to further execute a determining procedure that determines whether said operation input timing is specific timing and, if it is determined that said operation input timing is said specific timing by said determining procedure, the program enlarges said predetermined ranged such that a maximum value of said numerical value is increased in said displaying procedure, and causes said computer to sequentially display numerical values in said range repeatedly.

4. The recording medium according to claim 1, wherein said video game virtually realizes a battle between a player character and an enemy character and said control value is an attacking power of said player character.

5. The recording medium according to claim 1, wherein said video game virtually realizes a battle between a player character and an enemy character and said control value is an amount of damage of said enemy character.

6. The recording medium according to claim 1, wherein said video game virtually realizes a battle between a player character and an enemy character and said control value is a recovery power of said player character.

7. The recording medium according to claim 4, wherein said video game virtually realizes a battle between said player character and an enemy character via a card to be displayed on said screen.

8. A method of setting a control value in a video game for causing a computer to make a video game progress on a screen based on a control value to be numerically set in a game progress process, comprising:

sequentially displaying different numerical values repeatedly on said screen;

comparing display timing of each numerical value to be displayed on said screen when displaying, with operation input timing by a player; and setting a numerical value displayed at displaying timing coinciding with said operation input timing as the control value based on a result of the comparison in said comparing step.

9. The method of setting a control value in a video game according to claim 8, further comprising sequentially displaying numerical values in a predetermined range repeatedly on said screen.

10. The method of setting a control value in a video game according to claim 8, further comprising determining whether said operation input timing is specific timing, wherein, if it is determined that said operation input timing is said specific timing when determining, the method enlarges said predetermined ranged such that a maximum value of said numerical value is increased when displaying and causes said computer to sequentially display numerical values in said range repeatedly.

11. The method of setting a control value in a video game according to claim 8, further comprising realizing, virtually, a battle between a player character wherein an enemy character and said control value is an attacking power of said player character.

12. The method of setting a control value in a video game according to claim 8, further comprising realizing, virtually, a battle between a player character wherein an enemy character and said control value is an amount of damage of said enemy character.

13. The method of setting a control value in a video game according to claim 8, further comprising realizing, virtually, a battle between a player character wherein an enemy character and said control value is a recovery power of said player character.

14. The method of setting a control value in a video game according to claim 11, further comprising realizing, virtually, a battle between said player character and an enemy character via a card to be displayed on said screen.

15. A game apparatus that causes a computer to make a video game progress on a screen based on a control value to be numerically set in a game progress process, comprising:

a display system that sequentially displays different numerical values repeatedly on said screen;

a comparing system that compares display timing of each numerical value to be displayed on said screen by said display system with operation input timing by a player; and a setting system that sets a numerical value displayed at displaying timing coinciding with said operation input timing as the control value based on a result of comparison by said comparing system.

16. The game apparatus according to claim 15, wherein the game apparatus causes said computer to sequentially display numerical values in a predetermined range repeatedly on said screen in said displaying system.

17. The game apparatus according to claim 15, further comprising determining system that determines whether or not said operation input timing is specific timing, wherein, if it is determined that said operation input timing is said specific timing by said determining system, the game apparatus enlarges said predetermined ranged such that a maximum value of said numerical value is increased in said displaying system and causes said computer to sequentially display numerical values in said range repeatedly.

18. The game apparatus according to claim 15, wherein said video game virtually realizes a battle between a player character and an enemy character and said control value is an attacking power of said player character.

19. The game apparatus according to claim 15, wherein said video game virtually realizes a battle between a player character and an enemy character and said control value is an amount of damage of said enemy character.

20. The game apparatus according to claim 15, wherein said video game virtually realizes a battle between a player character and an enemy character and said control value is a recovery power of said player character.

21. The game apparatus according to claim 18, wherein said video game virtually realizes a battle between said player character and an enemy character via a card to be displayed on said screen.

* * * * *

UNITED STATES PATENT AND TRADEMARK OFFICE
CERTIFICATE OF CORRECTION

PATENT NO. : 6,786,825 B2
DATED : September 7, 2004
INVENTOR(S) : A. Kawazu

It is certified that error appears in the above-identified patent and that said Letters Patent is hereby corrected as shown below:

<u>Title page,</u>
Item [57], ABSTRACT,
Line 7, "form" should be -- from --.

Signed and Sealed this

Thirty-first Day of May, 2005

JON W. DUDAS
*Director of the United States Patent and Trademark Office*